(No Model.)

W. H. MARKLAND.
ELECTRIC CURRENT INDICATOR.

No. 371,958. Patented Oct. 25, 1887.

UNITED STATES PATENT OFFICE.

WYLLIS H. MARKLAND, OF ALTOONA, PENNSYLVANIA.

ELECTRIC-CURRENT INDICATOR.

SPECIFICATION forming part of Letters Patent No. 371,958, dated October 25, 1887.

Application filed September 24, 1886. Serial No. 214,434. (No model.)

*To all whom it may concern:*

Be it known that I, WYLLIS H. MARKLAND, of Altoona, Blair county, Pennsylvania, have invented a new and useful Improvement in Electric-Current Indicators, of which the following is a true and exact description, due reference being had to the accompanying drawings, which form part hereof.

The object of my invention is to provide an indicator for testing the electro-motive force or strength of an electric current and the resistance thereto, which shall, without loss of efficiency, be more simple than the indicators now in use and more compact and convenient to handle. This I accomplish by the means hereinafter described in connection with the drawings, in which—

Figure 2:
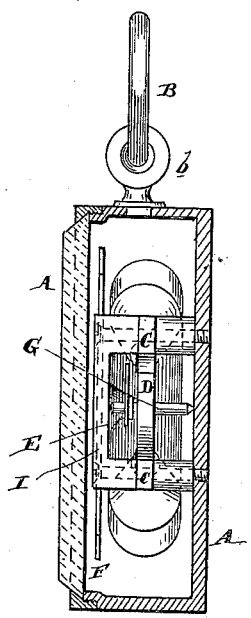
Figure 1:
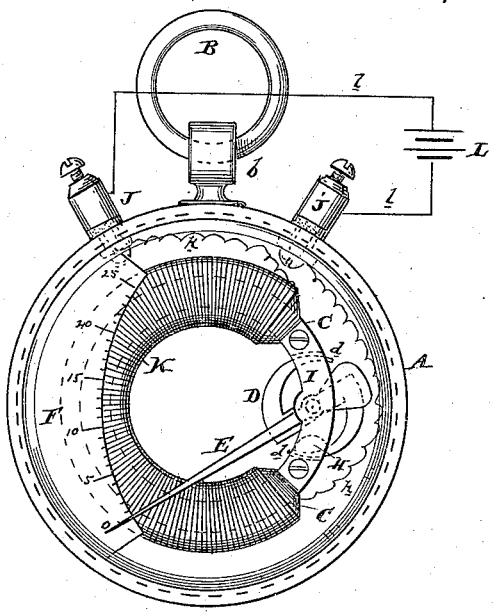
Figures 4, 5:
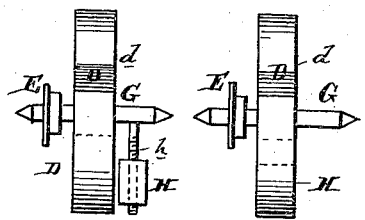
Figure 3:
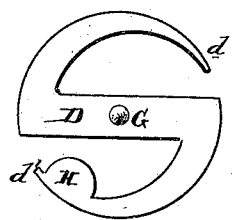

Figure 1 is a front view of my improved indicator; Fig. 2, a side view of the indicator with the casing cut away. Fig. 3 is an enlarged plan of the armature; Fig. 4, a side view of the armature with its bearing-spindle, and Fig. 5 a similar view showing a modified counterbalancing device.

A is a case of metal or other similar material, having preferably a glass face, A'.

B is a handle, made preferably in the form of a ring, and it fits loosely in an eye, b, of the case.

C is an electro-magnet of curved shape, as shown.

D is an armature, made in an S form, as shown in Fig. 3, and having curved ends d and d', which I prefer to make tapering, as shown in the drawings. This armature is supported on a spindle, G, working in suitable bearings between the poles of the magnet C.

E is a counterbalanced pointer supported on the shaft G; F, a scale attached to the casing A.

H is a counter-weight either attached to or formed with one arm of the armature, as shown in Figs. 3 and 4, or attached to the shaft G, as in Fig. 5, and by means of which the pointer E is kept at zero on the scale F when no current is passing. As shown in Fig. 5, the counter-weight H is screwed on a shaft, h, attached to the spindle G, and is thus made easily adjustable.

J J are binding-posts secured to the casing A and connected with the electro-magnet C, in the usual way.

The spindle G with its armature D and pointer E are secured midway between the poles of the electro-magnet C, the counter-weight H being so arranged as to keep the pointer at the zero-mark on the scale F when the case is suspended from its handle B and no current passing through the electro-magnet C. The armature is also so arranged that when in this position the ends of its curved arms d and d' will come opposite the respective poles of the magnet C. If, now, the posts J J are connected with an electric generator or battery, the core of the electro-magnet C, becoming magnetized, will attract the armature D in proportion to the strength of the current and tend to cause it to revolve, so that the ends of the curved arms d and d' will pass the poles. This tendency is, however, resisted by the counter-weight H, the leverage of which increases rapidly as the armature revolves, and the weight makes a horizontal plane, and the effect of the current is therefore to move the armature in each case to an angular position, in which the intensity of the magnetic force of the magnet C, due to the intensity or strength of the current, is balanced by the rising counter-weight H, the indicator E rising on the scale F as the armature turns, and showing the intensity of the current or electro-motive force.

I have now described my improved indicator in what I believe to be its best and most practicable form; but as my device possesses new and useful features aside from the combination of all the parts as shown and described, I do not wish to be understood as limiting myself only to such general combination. For instance, my armature may have a spring or other force to counteract the force of the current, instead of the weight, which I prefer to use and which has great advantages over a spring. The pointer may be omitted or changed in form, any system of indicating the angular movement of the armature taking its place, and the electro-magnet need not be of the circular form shown, although I greatly prefer to construct it so.

The circular shape of the magnet employed in my device increases the intensity of the magnetic field in which the indicating-armature operates, thereby adding largely to the sensitiveness of the instrument. The circular form also adapts it to be readily inserted in the convenient style of casing illustrated in the drawings, so as to occupy comparatively small space.

Having now described my invention, what I claim as new, and desire to secure by Letters Patent, is—

1. In an electric indicator, the combination, with an electro-magnet of circular shape, of an S-shaped armature having curved arms located between and opposite the magnet-poles and pivoted to revolve in the plane of the magnet, substantially as and for the purposes specified.

2. In an electric indicator, the combination, with a circular electro-magnet, of a pivoted S-shaped armature having curved arms, and a counter-weight adjusted to keep the extremities of the armature-arms in front of the poles of the magnet when no current is passing and to act in opposition to the force of the current when it is passing, substantially as and for the purpose specified.

3. In an electric indicator, the combination, with a circular electro-magnet, of a pivoted S-shaped armature having curved arms, a counter-weight, H, and a balanced pointer, E, and scale F, substantially as and for the purpose specified.

4. The combination of the case A, having a suspending-ring, B, with an electro-magnet, C, S-shaped armature D, having curved arms $d\ d'$, counter-weight H, pointer E, and scale F, forming an electric indicator, substantially as and for the purpose specified.

5. The combination of the case A, having a suspending-ring, B, with a circular electro-magnet, C, S-shaped armature D, having curved arms $d\ d'$, counter-weight H, pointer E, and scale F, forming an electric indicator, substantially as and for the purpose specified.

WYLLIS H. MARKLAND.

Witnesses:
 JNO. D. BOWMAN,
 A. W. MECHEN.